United States Patent [19]

Arnold et al.

[11] Patent Number: 5,107,779
[45] Date of Patent: Apr. 28, 1992

[54] PROCESS AND DEVICE FOR RECOGNIZING MISSED STITCHES DURING THE OPERATION OF A SEWING MACHINE

[75] Inventors: Kurt Arnold, Kaiserslautern; Wolfgang Hauck, Weilerbach; Reiner Klein, Kaiserslautern, all of Fed. Rep. of Germany

[73] Assignee: G.M. Pfaff Aktiengesellschaft, Kaiserslautern, Fed. Rep. of Germany

[21] Appl. No.: 765,025

[22] Filed: Sep. 24, 1991

[30] Foreign Application Priority Data

Sep. 26, 1990 [DE] Fed. Rep. of Germany ....... 4030420

[51] Int. Cl.⁵ .......................................... D05B 69/36
[52] U.S. Cl. .................................. 112/278; 112/262.1; 200/61.18
[58] Field of Search ............... 112/278, 273, 262.1; 200/61.18, 61.13; 242/37 R

[56] References Cited

U.S. PATENT DOCUMENTS

| | | | |
|---|---|---|---|
| 4,170,951 | 10/1979 | Dobrjanskyj | 200/61.18 X |
| 4,328,757 | 5/1982 | Inaba et al. | 112/278 |
| 4,628,847 | 12/1986 | Rydborn | 112/273 |
| 4,763,588 | 8/1988 | Rydborn | 112/273 |

Primary Examiner—Peter Nerbun
Attorney, Agent, or Firm—McGlew & Tuttle

[57] ABSTRACT

To recognize missed stitches during the operation of a sewing machine, a function, which represents the tensile force of a thread fed into a stitch-forming device depending on the angle of rotation of the main shaft, is scanned in its entirety during each revolution period of the main shaft for selected characteristics without regard to the location of this characteristic within the revolution period. The characteristics found are measured in order to obtain for each characteristic an analytical value that is compared with the corresponding analytical value from at least the last preceding revolution period to form the difference of the two analytical values. If this difference exceeds a predeterminable value, a decision corresponding to a missed stitch is made.

19 Claims, 3 Drawing Sheets

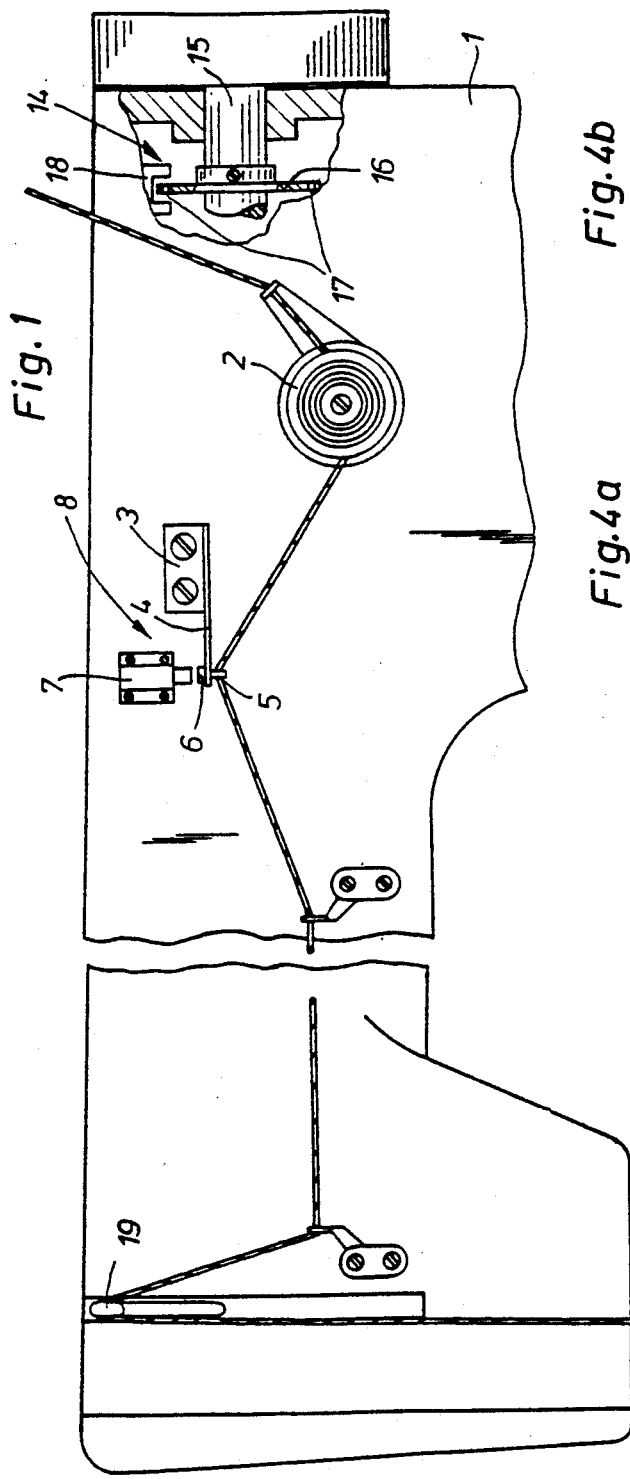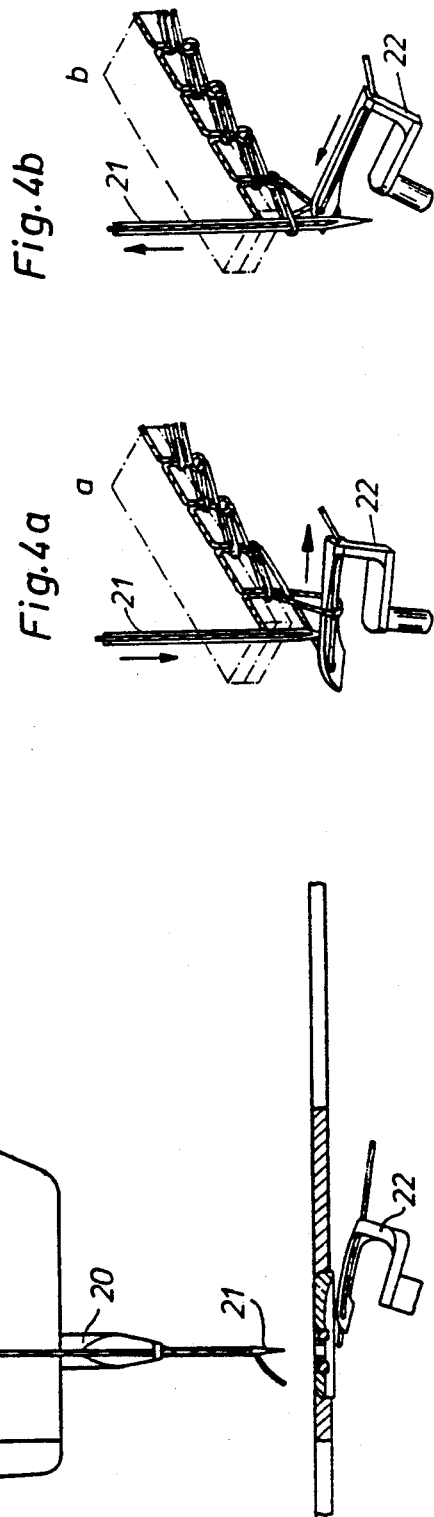

PROCESS AND DEVICE FOR RECOGNIZING MISSED STITCHES DURING THE OPERATION OF A SEWING MACHINE

FIELD OF THE INVENTION

The present invention pertains to a process for recognizing missed stitches during the operation of a sewing machine by analysis of a thread force function, which function represents a tensile force of a thread fed into a stitch forming device. The present invention also pertains to a device for carrying out such a process, including a thread force-measuring device for picking up measured values of the tensile force of a thread fed into the thread-forming device and with an evaluating device for analyzing thread force function.

BACKGROUND OF THE INVENTION

A device known from U.S. Pat. No. 4,170,951 for recognizing missed stitches has a thread force-measuring device with a spring clip, with a wire strain gage element fastened to it, which is arranged on the sewing machine in the path of the needle thread. This element generates an electrical voltage that is proportional to its deformation caused by the deflecting movement of the spring clip. The electrical voltage, which consequently ultimately represents the tensile force in the needle thread ("thread force"), is sent via an amplifier and a low-pass filter to the input of an analog/digital converter in order to form a series of digital measured values from it, which are sent to the signal input of a digital evaluating device.

A first, lower maximum is formed in the course of a stitch during the widening of the needle thread loop, and a second, higher maximum of the tensile force is generated during knotting. To detect a missed stitch, checking is performed to determine whether or not the lower maximum reaches a defined minimum level. To do so, the evaluating device presets a defined time window, whose position corresponds to the expected location of the lower maximum, during each period of revolution of the main shaft. The measured values are compared within the time window with a threshold value in order to signal a missed stitch when the amplitude of the measured values within the time window remains below this threshold value.

The change in the tensile force over time within one period of revolution of the main shaft is not always the same even in the case of trouble-free operation of the sewing machine, but it may change from one case to the next, depending on various external conditions, e.g., the material of the thread or the nature of the fabric to be sewn. Thus, the measured value curve being monitored to recognize missed stitches may differ from one case to the next, so that special precautionary measures are to be taken to guarantee satisfactory recognition of missed stitches despite these differences.

A measure pointing in this direction, which is realized in the above-described prior-art device, consists of standardizing the measured values to be compared with the threshold value within the time window to the base value of the measured value curve by scanning this base value, i.e., the measured value amplitude occurring prior to the expected maximum, within a correspondingly positioned further time window and subtracting it from the measured values to be compared. The threshold value used for the comparison in the prior-art case is also set to a level which depends on the amplitude of the second, higher maximum (e.g., to about 5% of this amplitude). Since the prior-art device contains no special means for detecting this amplitude, it is necessary to use any empirical value.

Only amplitude differences of the thread force curve can be compensated for with the above-mentioned measures. However, there are also differences or variations in the chronological location of the thread force maximum to be monitored. If, for example, the machine speed changes, the entire profile of the thread force curve will be shifted. To take this circumstance into account, a plurality of consecutive measured values are checked within the time window in the prior-art case, and a missed stitch is signaled only if all these measured values are below the threshold set.

However, the changes in the thread force depend on so many parameters and may be so different depending on the particular class of the sewing machine that the above-described precautionary measures may not suffice under certain conditions for reliably detecting missed stitches. In particular, the flexibility and the adaptability of missed stitch recognition is limited by the strict presetting of defined time windows. It is, of course, possible to adjust, besides the threshold level, also the starting point and the width of the actual time window to the course of the thread force that can be expected in the particular case, but this requires skilled workers and a corresponding device. Aside from this, it is not always possible to accurately predict the locations of possible maxima of the thread force curve for all conditions. The actual shape of the thread force curve in the case of a missed stitch is also hardly predictable in many cases. Since missed stitches are very rare compared with normal stitches (the probability of missed stitches is a fraction of one per thousand), it would be necessary to perform relatively long test runs covering many thousand stitches to find out how a missed stitch is manifested in the shape of the curve. This would take much time and material.

A device which recognizes missed stitches under defined conditions on the basis of the thread force signal even without a time window is known from DE-AS 26,06,035. In this device, the total mean value of the thread force signal formed over preceding revolution periods of the main shaft, multiplied by a weighted set value, is selected as the threshold for detecting a supernormal peak value which indicates a missed stitch. However, this functions only if the missed stitch is really manifested as an above-normal absolute peak value of the thread force, i.e., in the special case of "sewing on continuous rows of zippers", for which the prior-art device is expressly designed. However, if a missed stitch is manifested differently, e.g., by the missing of one of several maxima of the thread force curve (e.g., as will be described below), the above-described prior-art "time window-less" method is obviously unfit for use.

SUMMARY AND OBJECTS OF THE INVENTION

It is an object of the present invention to analyze a function representing the changes in the thread force in a sewing machine for the purpose of missed stitch recognition such that it is possible, without complicated pre-adjustment, to reliably detect missed stitches even under greatly differing general conditions.

According to the invention, a process and device are provided for recognizing missed stitches during the operation of a sewing machine. The process includes providing a thread force function which represents a tensile force of a thread fed into a stitch-forming device, depending on an angle of rotation of a main shaft within one revolution. The process includes scanning the entire thread force function within each revolution period with respect to at least one selected characteristic regardless of the location of the occurrence of the characteristic. The characteristics found are then measured to provide analytical values. The analytical values thus determined are compared with corresponding analytical values of at least a last preceding revolution period. The last preceding revolution period is determined in the same manner (based on a thread force function for a proceeding revolution period). A difference between the two analytical values is determined and compared to a predeterminable value in order to make a decision corresponding to a missed stitch. The force function for one revolution period is provided using a thread force-measuring device for picking up measured values of the tensile force of a thread fed to the thread-forming device. An evaluating device is provided which analyzes the function described by successive measured values within one revolution period of the main shaft.

The evaluating device includes a characteristic detector which scans, within each revolution, the entire thread force function according to at least one selected characteristic regardless of the location of occurrence and measures the characteristics found in order to obtain characteristic analytical values. A memory device is provided which stores the analytical values thus determined for at least the duration of one revolution period. A comparison device is provided which forms a difference from analytical values obtained for a current revolution period and analytical values, in the same manner, for at least a last preceding revolution period. An indication of a missed stitch is then provided based on the difference of the two analytical values with respect to a predeterminable value or threshold value.

The solution according to the present invention is based on the discovery that any significant deviation of the thread force function formed in the course of one revolution period of the main shaft from the thread force functions of the preceding periods is already a sufficient indicator for a missed stitch, i.e., an abrupt disturbance in the "periodicity" of the total function is indicative of a missed stitch, so that monitoring this periodicity may be sufficient for recognizing missed stitches without the need to check exactly where within the period the phenomenon that is responsible for the disturbance in periodicity occurs. Thus, it can become unnecessary to preset time windows to recognize a missed stitch.

Consequently, it is not necessary for monitoring the periodicity to locate a characteristic appearing within a predetermined time window. According to the present invention, the entire thread force function is scanned during each revolution period of the main shaft of the sewing machine according to one or several selected characteristics, regardless of where these characteristics can be found within the period. To check the periodicity, the characteristics found are measured, and the analytical values thus determined are compared with values determined in the same manner during one or several preceding periods to form difference values in order to generate a warning signal indicating a missed stitch when a difference value exceeds the associated predeterminable value.

A function describing the thread force curve has many "characteristics" which can be detected regardless of where they occur, i.e., without using a time window, and which change significantly in the case of a missed stitch. These characteristics include, e.g., the passages of the thread force curve through a reference line, which may be the mean value of the function. The abscissa values of these passages can be determined as analytical values to be compared. Further analytical values may be the ordinate and/or abscissa values of peaks of the amplitudes of the function located between two successive passages through the mean value. The area content (integral) or the mean amplitude of the thread force curve within the individual amplitudes also changes, usually considerably, when a missed stitch occurs. In an advantageous embodiment of the present invention, these magnitudes are determined and used as analytical values for missed stitch recognition in the manner described in the present invention.

The periodicity of the thread force curve can also be investigated by comparing all ordinate values of the function with the corresponding values of one (or several) preceding periods, and a missed stitch is considered to be present if the sum of the individual difference values exceeds a predeterminable value.

It is important for the function analyzed to be obtained as a function of the angle of rotation of the main shaft rather than as a function of time, because the duration of the period of the function and consequently also some of the analytical values determined would otherwise depend on the speed. According to a special embodiment of the present invention, the output signal of the thread force measuring device is therefore polled in a cadence (and in the digital form without conversion) whose frequency is proportional to the speed of the main shaft. An incremental transducer driven by the motor of the machine or the main shaft is preferably used to generate the timing signals.

The present invention and its advantageous embodiments will be explained below on the basis of drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a side view of a sewing machine with a thread force-measuring device for missed stitch recognition;

FIGS. 4a and 4b are views of stitch-forming elements of the sewing machine during different phases of stitch formation with FIG. 4a showing the penetration of the needle into a thread triangle formed by the needle thread loop and the looper thread, and FIG. 4b showing the time of capture of the needle thread loop by the looper.

DETAILED DESCRIPTION OF THE PREFERRED EMBODIMENT

Figure 2:
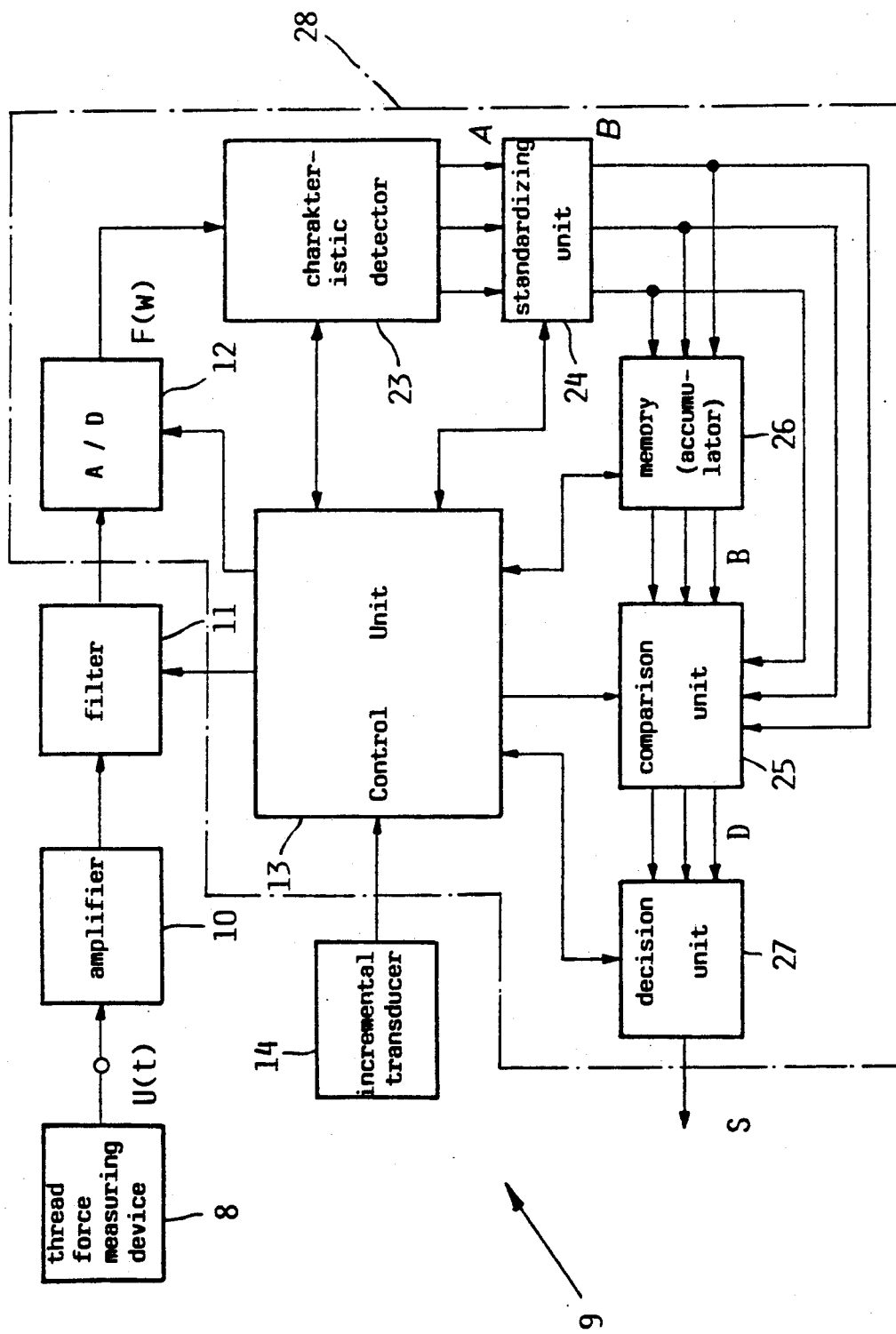
FIG. 2 is an evaluating device for carrying out the missed stitch recognition process according to the present invention.

A tensioning device 2 for the needle thread arriving from a thread reserve (not shown) is arranged on the stand 1 of the double chain stitch sewing machine shown in FIG. 1. A tension sensor 3 with a transverse beam 4, which carries, at its free end, a thread guide 5 on the underside and a magnet 6 on the top side, is fastened on the sewing machine behind said tensioning device 2 in the thread supply direction. A Hall generator 7, which detects the deflection of said transverse beam 4 caused by a change in the thread force at the needle thread and consequently the change in the distance of said magnet 6 by determining the change in the value of the magnetic field, is arranged opposite said magnet 6, separated from it by an air gap. Together with said tension sensor 3, said Hall generator 7 forms a thread force-measuring device 8.

The evaluating device 9 shown in FIG. 2 is preceded by such a thread force-measuring device 8. During the operation of the sewing machine, the thread force changes during each stitch formation period in a characteristic manner, which may be different from one case to another, depending on the class of the sewing machine, the speed of sewing, the thread tension, and the materials of the fabric being sewn and the thread. Said thread force-measuring device 8 is designed such that during the operation of the sewing machine, its output carries a time-dependent voltage signal U(t) which corresponds to the changes in the thread force over time.

The analogous, quasi-periodic thread force signal U(t) is amplified in an amplifier 10, freed from the spectral components not containing information by a digital adjustable filter 11 depending on the instantaneous speed of the machine, and then converted into a digital signal by means of an A/D converter 12. The setting of said filter 11 and the timing control of said A/D converter 12 are performed by a digital control unit 13 which receives timing control impulses from an incremental transducer 14 which is coupled, as shown in FIG. 1, with the main shaft 15 of the sewing machine. Said incremental transducer 14 has an impulse disk 16, which is fastened to said main shaft 15 and is provided with a predetermined number of passage openings 17 arranged at equal angular distances, and a light scanning device 18, which responds to division marks 17.

Said incremental transducer 14 subdivides each revolution of said main shaft 15 into a predetermined number of equal angle steps dw (e.g., 200 angle steps per revolution), and generates one impulse per angle step. The repetition frequency of these impulses therefore depends on the speed, and can be used by said control unit 13 as information on the speed-dependent setting of said filter 11. In addition, said control unit 13 uses the timing control impulses (or a frequency-divided version of these impulses) arriving from said incremental transducer 14 for the timing control of said A/D converter 12, so that digital scan values of the thread force signal will appear at the output of this converter in a sequence that is synchronous with the speed. This means that the scan values represent the thread force as a function of the angle of rotation rather than as a function of the absolute time t.

Figure 3:
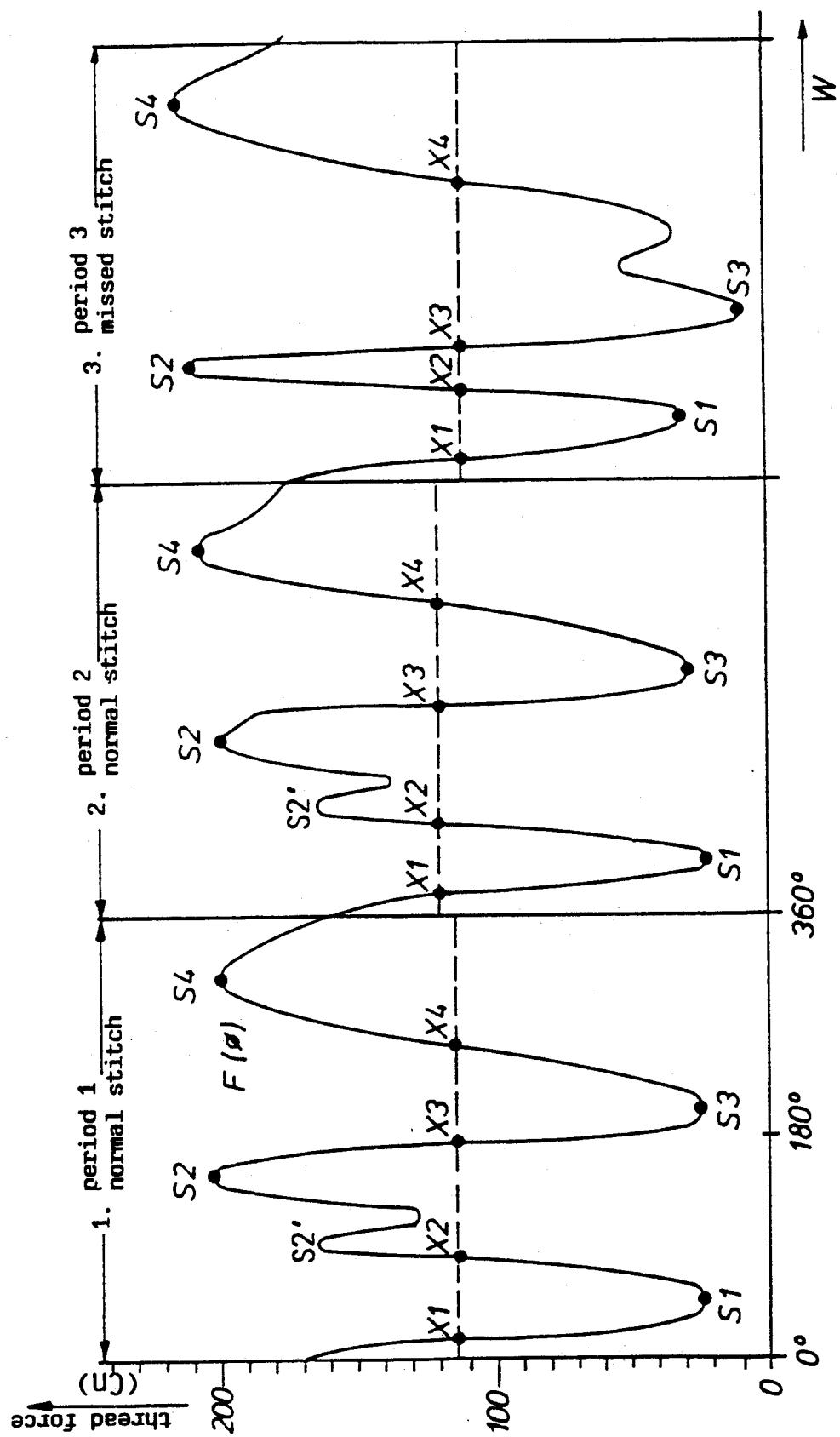
FIG. 3 represents the changes in the thread force as a function of the angle of rotation of the main shaft during the operation of the sewing machine during normal stitches and a missed stitch.

FIG. 3 shows an example of the shape of such a "speed-standardized" thread force function F(w). This shape results from the interplay of the needle thread with the thread lever 19 represented in FIG. 1, the needle 21 carried by the needle bar 20, the looper 22, and the looper thread, wherein said thread lever 19, said needle bar 20, and said looper 22 are driven by said main shaft in a manner not shown.

In FIG. 3, the angle of rotation w of said main shaft 15 in degrees of angle is shown on the abscissa, while the ordinate shows the value of the thread force F in centiNewton (cN). The thread force function F(w) is shown over three successive revolution periods of said main shaft 15. In the example shown, each period begins and ends at a main shaft angle of rotation that corresponds to the top dead center of said needle 21. However, it is also possible to place the limits of the period at other points of the stitch formation cycle.

The thread force curve has minima at the points S1 and S3 and maxima at the points S2', S2, and S4. On its way to the lower inflection point, said needle penetrates at point S1 into a thread triangle (FIG. 4a) formed by the looper thread and the needle thread loop that is held by said looper 22 and is located in the preceding stitch hole. Since the needle thread loop is slightly expanded during the pulling out of said looper 22 from the needle thread loop, and more needle thread is consequently pulled in, the thread force briefly rises (point S2'). As a consequence of the subsequent upward movement of said needle 21, a new needle thread loop is formed, which is caught by said looper 22 (FIG. 4b). Due to widening of the needle thread loop, the thread force reaches a maximum at point S2. Part of the needle thread pulled in as a result is carried upward during the further movement of said needle 21, as a result of which the thread force decreases and reaches a minimum at point S3. Due to the upward movement of said needle thread 19, the loop formed is tightened, and the thread force reaches a maximum at point S4.

During the subsequent second period, the thread force function F(w) does not have exactly the same shape as during the first period, even though trouble-free stitch formation takes place in this case as well (normal stitch). The differences that can be recognized, e.g., the less monotonically decreasing thread force after tightening, can be considered to be normal.

A major deviation from the preceding periods can be recognized during the third period, when a so-called stitch-off error occurs. Such an error occurs when said needle 21 misses the thread triangle shown in FIG. 4a after penetrating the fabric being sewn. In this case, the thread force again decreases immediately to a minimum (point S3) after attempted widening of the needle thread loop.

While a similar situation occurs in the case of breakage of the looper thread, other errors in stitch formation lead to different phenomena. When a so-called pick-up error occurs, e.g., when said looper 22 misses the needle thread loop, or in the case of breakage of the needle thread, the tightening movement meets hardly any resistance at all, so that the thread force increases only slightly, if at all, during the second half of the period. The amplitude (point S4) of the thread force function located at the end of the period would be missing in this case. At any rate, a major change consequently occurs in the profile of the thread force function, regardless of the case of a missed stitch.

To recognize such changes, selected points of the thread force function, at which changes in amplitude can be expected to occur in the case of missed stitches, have hitherto been selectively monitored by means of time windows, as was described in the introduction. A different approach is taken with the present invention by scanning the entire thread force function within each period with respect to selected characteristics, regardless of where these characteristics occur within the period. The characteristics found are then measured, and the analytical values thus determined are compared with the analytical values of at least one preceding period, which were determined in the same manner, to form difference values in order to recognize a missed stitch in the case of deviations that exceed a predetermined value.

For example, the passages of the function through the respective mean value which occur during each period may be selected to be the characteristic features of the thread force function. In FIG. 3, the mean value of the thread force function F(w) within each period is indicated by a horizontal broken line, and the successive passages of the function through this mean value are designated by X1, X2, X3, and X4. As can be recognized from FIG. 3, the distances X1–X2, X2–X3, and X3–X4 between the passages through the mean value during the first period are approximately equal to the corresponding distances found during the second period. In contrast, in the third period, which contains a missed stitch, the distance X2–X3 is much smaller, and the distance X3–X4 is much greater than during the preceding period, even though the distance X1–X2 is the same as before. Consequently, to recognize a missed stitch, it is sufficient in the case described to measure the distances between the successive passages through the mean value during each revolution period of said main shaft 15 and to determine the difference from the distance values thus determined and the distance values of the preceding revolution period in order to generate a warning signal indicating a missed stitch if a significant change occurs in at least one of the distance values.

Instead of the above-mentioned distances, it is also possible to determine the abscissa values of the four passages X1 through X4 through the mean value for each period and to use them to form the difference. There is a significant change during the missed stitch period in this case as well, but it is only in one of the values determined, namely, the abscissa value of the third passage through the mean value.

Further characteristics of the thread force function F(w) are the peak values of successive deflections that are alternatingly positive and negative relative to the mean value. In the case of FIG. 3, the relative value of the positive peak S2 (i.e., the value relative to the corresponding mean value) as well as that of the subsequent negative peak S3 change when a missed stitch occurs. However, this change is less significant in the case described than the changes in the distances X2–X3 and X3–X4.

In the example according to FIG. 3, the abscissa of the peak S3 of the second negative amplitude also changes when a missed stitch occurs, because these peaks appear sooner. It can therefore be useful to determine the abscissa values of the peaks of consecutive amplitudes and to form the difference with corresponding values of one or several preceding revolution periods.

FIG. 3 also shows that the area integrals of the areas of the individual amplitudes of the thread force function with the corresponding mean value curve change greatly when a missed stitch occurs. In the case of the stitch-off error shown in the third period of claim 3, the area of the first positive amplitude between the passages X2 and X3 is substantially smaller than in the case of a normal stitch, while the area of the deflection between X3 and X4 is substantially greater. By measuring the areas of successive amplitudes, it is consequently possible to determine analytical values which can provide information on the occurrence of a missed stitch by forming the difference values using preceding analytical values.

The above-described characteristics and analytical values are informative not only for the stitch-off error shown, but also for other types of missed stitches, e.g., pick-up errors. Since the entire function is analyzed without restriction to a predetermined time window, the exact location of a significant change in the thread force function is irrelevant for the recognition of a missed stitch; the fact that a significant change occurs is sensed.

To perform the analysis according to the present invention, the device according to FIG. 2 contains a characteristic detector 23, to which the successive scan values of the thread force function F(w) are sent from said A/D converter 12. Under the effect of said control unit 13, said characteristic detector 23 scans the set of scan values which corresponds to one revolution period according to selected characteristics, e.g., the above-mentioned passages through the mean value and the amplitudes. The mean value can be obtained in a simple manner by adding all scan values of one revolution period and subsequently dividing the sum by the number of scans. Instead of the mean value of the current period, it is also possible to use the mean value of the respective preceding period (or a plurality of preceding periods). Said characteristic detector 23 also measures the characteristics found, and abscissa values can simply be expressed as the number of scanning time periods. The area of individual amplitudes, i.e., the integral of the amplitude in question, can be obtained by adding up all scan values of the corresponding amplitude. Peak values can also easily be found and determined by the digital technique.

The analytical values A thus determined, which appear in digital form at the output of said characteristic detector 23, are sent before processing to a standardizing unit 24, which serves the purpose of compensating for differences in the amplification of the thread force function, which are caused by, e.g., heating or aging of components of said thread force-measuring device 8. An increase in amplification would lead, for example, to all ordinate values of the function becoming greater by a certain factor. Thus, the components of the analytical values which are related to the ordinate also change correspondingly. To compensate for these changes and yet always obtain comparable analytical values despite different gains, the ordinates of the analytical values are standardized to the mean value of the function. This can be done, for example, by multiplying each ordinate by a factor that is inversely proportional to the sum of all scan values. The mean value of the thread force function thus becomes the unit of measurement for the ordinate values.

The analytical values B standardized in the above-described manner are sent to a first input of a comparison unit 25 and simultaneously entered into a memory 26. After a predetermined time interval, when the standardized analytical values B of the next revolution period appear at the first input of said comparison unit 25, the stored analytical values are read out, and difference values D are formed in said comparison unit 25 from these and the values of the next revolution period in question. The difference values D are checked in a decision unit 27 to determine whether they exceed a predeterminable value. If they do, said decision unit 27 sends a warning signal S to its output to indicate a missed stitch.

Said memory 26 may also contain an accumulator, which adds up the standardized analytical values B entered into the memory over a plurality of revolution periods and forms averages from the values added, and these averages are sent to said comparison unit 25 as reference values for the analytical values B of the current period. If desired, the average may be formed with different weightings of the analytical values from different revolution periods: the farther back the revolution period in question is located, the slighter the weighting should preferably be.

Said decision unit 27 may be designed such that it generates the warning signal S each time a single standardized analytical value B or a predetermined plurality of standardized analytical values B from the current period deviate(s) from the corresponding analytical values of the preceding period or periods by more than a predeterminable amount. However, it is also possible to determine a total deviation value from the deviations of different analytical values, if desired, with different weightings of the individual difference values, in order to generate the warning signal S only if this total value exceeds the predeterminable value.

The threshold value for the total deviation should be selected to be such that it shall be smaller than the sum of the individual analytical values corrected by the associated weight, so that the set value will already be exceeded when, e.g., more than one analytical value comes close to its permissible deviation limit, even though all the analytical values of one stitch are below the permissible deviation from the set value in question. Due to this measure, even stitches during which looping of the needle thread and looper thread has taken place, but which are still not formed in a perfectly satisfactory manner, elicit an indication.

The decision on whether or not a normal stitch is present may also be made on the basis of the results of a direct superimposition of the thread force functions of successive revolution periods, i.e., all the successive ordinate values of the thread force function of the current period are used as analytical values. To make the decision, the difference between these ordinate values and the respective corresponding ordinate values of the preceding period (or one average ordinate value from a plurality of preceding periods) is formed in said comparison unit 25. These difference values obtained, some of which may be positive and some negative, are added as absolute values in said decision unit 27 in order to generate the warning signal when the sum exceeds a predetermined value. Consequently, generally speaking, the integral of the values of the differential function between the thread force function of the current period and that of the preceding period is formed in this embodiment, and a decision corresponding to the presence of a missed stitch is made when this integral assumes a supernormal value.

In the above description, one was confident that the first stitch of the sewing operation (or the first stitches in the case of averaging) would not be a missed stitch. This confidence is justified because, as was mentioned, missed stitches are rarer than normal stitches by several orders of magnitude. However, the infinitely low risk of a missed stitch right at the beginning of the sewing operation can be taken into account by entering empirical values for normal stitches prior to the beginning of sewing into said memory 26 or into the last stage of the accumulator. Such empirical values are easy to obtain, so that a corresponding presetting is not complicated. It would be much more involved to obtain empirical values for a missed stitch in order to set, e.g., the location and the width of any time window to recognize missed stitches.

It should finally be noted that the process described, as well as the device according to FIG. 2 can be realized by a microcontroller 28, at least insofar as said blocks 12, 13, and 23 through 27 are concerned.

The detection of the different individual characteristics can be realized in the characteristic detector, and the separate determination of the various respective associated analytical values and the corresponding difference values can be performed serially by time sharing or in parallel in structurally separate channels. The latter is indicated symbolically in FIG. 2 by the triple line bundle between said blocks 23 and 27.

While a specific embodiment of the invention has been shown and described in detail to illustrate the application of the principles of the invention, it will be understood that the invention may be embodied otherwise without departing from such principles.

What is claimed is:

1. A process for recognizing missed stitches during operation of a sewing machine, comprising: sensing tensile force of a thread fed into a stitch forming device and generating a thread force function depending on an angle of rotation of a main shaft within one revolution period; scanning the entire thread force function within each revolution period with respect to at least one selected characteristic, regardless of a location of the occurrence of said selected thread characteristic; measuring each said selected characteristic found to provide analytical values; comparing said analytical values with corresponding analytical values of at least a last, preceding revolution period, said corresponding analytical values being determined in the same manner as said analytical values; determining a difference between said analytical values and said corresponding analytical values and determining if said difference exceeds a predeterminable value to determine if a missed stitch has occurred.

2. A process according to claim 1, wherein said selected characteristic corresponds to the passage of said thread force function through a mean value of said thread force function and said analytical values are formed based on a distance between successive passages of the thread force function through said mean value.

3. A process according to claim 1, wherein said selected characteristic comprises deflections of said thread force function relative to a mean value of said thread force function, said analytical values including one of:
   a) widths of said deflections at said mean value;
   b) peak values of successive said deflections with respect to magnitude and direction;
   c) abscissa values of the peak values of said deflections;
   d) values corresponding to an integral of said deflections.

4. A process according to claim 1, wherein a missed stitch is indicated if a total value of said difference between the two analytical values determined for all analytical values during a comparison exceeds a predeterminable value.

5. A process according to claim 4, wherein said total value is formed from a sum of weighted difference values.

6. A process according to claim 1, wherein all of successive ordinate values of said thread force function that follow one another on an abscissa of said thread force function are determined as analytical values, a missed stitch being indicated if a sum or an integral of said values of the difference between the ordinate values of a current revolution period and corresponding ordinate values from at least a last preceding revolution period exceeds a predeterminable value.

7. A process according to claim 1, wherein said thread force function is formed by scanning a signal indicating a tensile force of a thread at a scanning frequency that is proportional to a speed of the main shaft to form a sequence of scanned values.

8. A process according to claim 7, wherein said scanned values are digitized and said steps of comparing analytical values and forming a difference between two analytical values are performed by digital computation techniques.

9. A process according to claim 3, wherein each said integral is obtained by accumulation of scanned values within an integration period.

10. A process according to claim 6, wherein each said integral is obtained by accumulation of scanned values within an integration period.

11. A process according to claim 1, wherein ordinates of said analytical values are standardized to a mean value of said thread force function.

12. A process according to claim 1, wherein reference values for each analytical value are determined as an average value of corresponding analytical values of a plurality of preceding revolution periods.

13. A process according to claim 12, wherein said average value is formed based on weighted analytical values of different preceding revolution periods, said weighting being based on the age of the revolution period relative to the most recent revolution period with older revolution periods having a lower weight.

14. A process according to claim 1, wherein empirical values for a trouble-free stitch formation are used as reference values for analytical values during a first of successive revolution periods of sewing operation.

15. A device for recognizing missed stitches during operation of a sewing machine via analysis of a thread force function, comprising: thread force-measuring means for sensing the values of a tensile force of a thread fed into a stitch-forming device; an evaluating means for analyzing a thread function based on successive measured values within one revolution period of a main shaft of the sewing machine, the evaluating means including characteristic detector means for scanning, within each revolution, an entire thread force function with respect to at least one selected characteristic, regardless of a location of an occurrence of said selected characteristic and measuring characteristics found in order to obtain characteristic analytical values; a memory device for storing said analytical values for at least one revolution period; comparison means for forming a difference between said analytical values and additional analytical values based on a last preceding revolution period, said additional analytical values being formed in the same manner as said analytical values, and for determining if said difference exceeds a predeterminable value to detect a missed stitch occurrence.

16. A device according to claim 15, wherein a signal from said thread force measuring device is filtered, depending upon the speed of the main shaft, in order to remove spectral components containing no information, from said thread force function.

17. A device according to claim 15, wherein an analog/digital converter is provided for sending digital scan values of said thread force function to said characteristic detector means, said analog/digital converter having a scanning frequency proportional to a speed of revolution of said main shaft, said analog/digital converter being associated with said thread-force measuring device.

18. A device according to claim 17, wherein said analog/digital converter, said characteristic detector means, said memory device and said comparison means are provided in a microcontroller element, said microcontroller element including a control unit receiving timing control pulses, said pulses having frequency proportional to a speed of said main shaft in order to set speed-dependent operating variables.

19. A device according to claim 15, wherein said characteristic detector means is connected to a standardizing unit, said standardizing unit multiplying said analytical values by a factor that is inversely proportional to a mean value of said thread force function.

* * * * *